United States Patent [19]

Kulyabko et al.

[11] 3,953,077
[45] Apr. 27, 1976

[54] VACUUM-AND-PRESSURE PNEUMATIC CONVEYING INSTALLATION FOR PULVERIZED MATERIALS

[76] Inventors: Valery Anatolievich Kulyabko, ulitsa 50 let Oktyabrya, 5, kv. 97; Nikolai Andreevich Evstigneeve, ulitsa Chaikovskogo, 2, kv. 50; Fedor Romanovich Petrov, prospekt Lenina, 55, kv. 33, all of Volzhsky; Anatoly Petrovich Pleshivtsev, ulitsa Bakinskaya, 5, kv. 27, Volgograd; Vasily Ivanovich Somov, ulitsa Krasnopiterskaya, 11, kv. 3, Volgograd; Leonid Mikhailovich Cherkasov, ulitsa Karpovskaya, 39, Volgograd; Mikhail Ivanovich Jusov, ulitsa Bobruiskaya, 2, kv. 35, Volgograd; Alexandr Alexandrovich Sivkov, ulitsa Engelsa, 11, kv. 44; Robert Nikolaevich Lazarev, ulitsa Sverdlova, 8, kv. 8, both of Volzhsky, all of U.S.S.R.

[22] Filed: May 14, 1975

[21] Appl. No.: 577,417

[52] U.S. Cl. .............................. 302/21; 214/17 CA; 222/56; 302/25; 302/50; 302/58
[51] Int. Cl.² ................... B65G 53/66; B65G 53/28
[58] Field of Search .................. 302/21, 23, 25, 50, 302/58; 222/52, 56, 64; 214/17 A, 17 CA; 141/198

[56] References Cited
UNITED STATES PATENTS

| 692,106 | 1/1902 | Bedarrides | 302/58 |
| 2,376,304 | 5/1945 | Anderson | 214/17 CA |
| 3,069,205 | 12/1962 | McIver et al. | 302/21 |
| 3,155,431 | 11/1964 | Baldwin | 302/23 |
| 3,460,869 | 8/1969 | Herr | 302/50 |
| 3,620,575 | 11/1971 | McIver et al. | 302/21 |

FOREIGN PATENTS OR APPLICATIONS

| 750,830 | 6/1956 | United Kingdom | 302/23 |

*Primary Examiner*—Evon C. Blunk
*Assistant Examiner*—Jeffrey V. Nase
*Attorney, Agent, or Firm*—Lackenbach, Lilling & Siegel

[57] ABSTRACT

The installation comprises a jet blower whose suction space is connected with a settling chamber for building up a vacuum therein required for drawing the material into said settling chamber and sucking dusty air from it while its delivery space is connected with an aerating chamber for building up pressure therein required for transporting the material from said chamber, and a hollow element, which is open at the bottom, and secured to the upper part of the settling chamber and having a lower edge for limiting the level of material in the settling chamber, the wall of said element being provided with at least one diaphragm connected by a rod with a valve built into the upper part of the settling chamber for controlling the supply of atmospheric air into the settling chamber when the latter becomes filled with material above the lower edge of said hollow element.

7 Claims, 7 Drawing Figures

VACUUM-AND-PRESSURE PNEUMATIC CONVEYING INSTALLATION FOR PULVERIZED MATERIALS

The present invention relates to a vacuum-and-pressure pneumatic conveying installation for such pulverized materials as, for example, cement, ash, soot, powdered lime, flour, coal dust, etc., and can be employed for taking in and conveying said materials in bulk from transport facilities into storehouses and plant buildings and also for transferring pulverized materials from one storehouse into another.

Known in the art is a vacuum-and-pressure pneumatic conveying installation for the above-mentioned applications comprising a portable suction device accommodating a settling chamber whose lower part has a built-in mechanism for unloading the material from the settling chamber and delivering it into an aerating chamber communicating with the conveying pipeline.

Mounted on the suction device is a vacuum pump which builds up vacuum in the settling chamber through the hose filters secured inside the settling chamber. Besides, there is a system of flexible hoses for the supply of compressed air and a material discharge hose connected to the aerating chamber.

The suction device of the known installation consists of a casing, a running gear, a loosening device, gathering discs and a suction nozzle connected with the settling chamber. The settling chamber consists of a welded shell made up of interconnected cylindrical and tapered parts and closed by a cover on the top.

Secured to the cover of the settling chamber is a system of hose filters and a mechanism intended to clean the hoses from precipitated dust.

The unloading mechanism of the known installation comprises a delivery auger with an electric drive, a sleeve of the delivery auger and a nonreturn valve closing the sleeve at the end. The unloading mechanism is connected with an aerating chamber comprising a casing and a pan which are separated by an air-permeable partition.

The known installation functions as follows. The process of sucking in and conveying the material commences by supplying compressed air into the pan of the aerating chamber and then starting the vacuum pump, the unloading mechanism and the delivery auger. As the installation approaches the handled material, the latter is loosened by the gathering discs and the atmospheric air and transformed into a solid-air mixture (becomes fluidized), sucked into the settling chamber where the solid-air mixture is completely separated into a material which first settles in the lower part of the settling chamber, carried by the delivery auger of the unloading mechanism into the aerating chamber and is then air sucked by the vacuum pump into the atmosphere through the hose filter.

Being saturated with compressed air supplied again from an outside source and passing from the pan through the air-permeable partition, the material moves from the aerating chamber in the form of a solid-air mixture and leaves the installation through the transport pipeline.

The known installation is characterized by some disadvantages. The hose filters located in the settling chamber pass a certain amount of dust and, being clogged with dust, increase the pressure difference before and after the filter which leads to deterioration of the filtering fabric, failure of the filters and an increased dust content in the ambient air. Besides, the filters require careful servicing and timely replacement in case of failure which tells on the reliability of the installation as a whole. The use of a vacuum pump for building up vacuum in the settling chamber complicates the installation and increases energy consumption.

The main object of the invention is to provide a vacuum-and-pressure pneumatic conveying installation for pulverized materials characterized by simplicity of design and reliability of operation.

Another object of the invention is to provide a vacuum-and-pressure pneumatic conveying installation which would reduce the dust content in the ambient air during operation.

Still another object of the invention is to provide a vacuum-and-pressure pneumatic conveying installation which would cut down the consumption of energy.

These objects are accomplished by providing a vacuum-and-pressure pneumatic conveying installation for pulverized materials comprising a suction device connected with a settling chamber whose lower part accommodates a mechanism for unloading the material from the settling chamber and delivering it into the aerating chamber communicating with a transport pipeline which has a jet blower whose suction space is connected with the settling chamber for building up a vacuum therein required for sucking the material into, and the dusty air from, the settling chamber and whose delivery space is connected with the aerating chamber for building up a pressure therein required for conveying the material from the chamber, the upper part of the settling chamber being provided with a hollow element open at the bottom and intended to limit the level of the material in the settling chamber by its lower edge, the wall of said element having at least one diaphragm connected by a rod with a valve built into the upper part of the settling chamber and intended to control the delivery of atmospheric air into the settling chamber when the latter becomes filled with the material above the lower edge of the hollow element.

The jet blower can be built into the casing of the aerating chamber with its suction space communicating through a pipeline with the upper part of the settling chamber.

The jet blower can be located between the settling and aerating chambers with its delivery and suction spaces connected with the aerating and settling chambers, respectively.

In case of such an arrangement of the jet blower it is practicable that the pipe connecting its suction space with the settling chamber should be provided with a nonreturn valve.

The jet blower can also be built into the upper part of the settling chamber and its delivery space can be connected by a pipe with the aerating chamber.

In this case the jet blower can be provided with a nonreturn valve mounted on the blower casing before its suction space.

Besides, it is practicable that the hollow element of the installation should be provided with a cyclone whose inside space communicates with the suction space of the jet blower.

The essence of the present invention consists in the following.

It is known that the delivery of compressed air into the aerating chamber of pneumatic conveying installations is accompanied by a drop of pressure difference. The jet blower in the installation, according to the invention, makes it possible to utilize completely the energy of the pressure difference of the compressed air delivered to the installation. Part of this energy is spent for sucking the material into, and drawing the dusty air out of, the settling chamber while the remaining energy is used for delivering the dusty air from the settling chamber into the aerating chamber and conveying the material through the transport pipeline. This has become possible because the bulk of the material is directed from the settling chamber through the unloading mechanism, bypassing the jet blower.

Besides, the jet blower sucks the dusty air from the settling chamber and delivers it into the aerating chamber. This dusty air (together with the air delivered from outside) is utilized for further conveyance of the material which reduces the amount of the compressed air supplied to the installation and thereby cuts down the energy consumption.

The provision in the installation, according to the invention, of the jet blower which sucks the material-air mixture into the settling chamber and draws the dusty air from it dispenses with the need for hose filters; in addition, since the suction space of the jet blower builds up the required vacuum in the settling chamber, the need for the vacuum pump is dispensed with too. The absence of hose filters and vacuum pump simplifies the design of the installation according to the invention and raises its reliability.

The location of the jet blower in the immediate vicinity of the settling chamber reduces the friction resistance and clogging of the pipe connecting the blower with the settling chamber. The selection of the location for the jet blower depends predominantly on the structural layout of the installation and the nature of the material handled.

The nonreturn valve which closes when pressure in the aerating chamber rises above the rated limit is provided on the pipe interconnecting the suction space of the jet blower with the settling chamber and is intended to prevent the blow-by of compressed air into the settling chamber through the suction space of the jet blower. Closing of the nonreturn valve ensures blowing of the transfer pipeline with highpressure compressed air and prevents bursting of said air through the suction nozzle thus providing for a dust-free process in case of a pressure rise in the aerating chamber and for prompt returning of the installation to the standard working conditions.

The cyclone installed in the settling chamber is designed to reduce the dust content in the air sucked into the jet blower which diminishes the concentration of the pulverized material in the air sucked into the jet blower from the settling chamber and reduces wear of the jet blower parts.

The installation according to the invention can be of either the stationary, overhead or self-propelled type. In the self-propelled installation the suction device is mounted on the common base of the installation which brings to a minimum the distance over which the material is sucked in and delivered into the settling chamber and ensures a higher output at the same vacuum. However, in special cases when, for example, the weight of the suction device or the height and length of the suction zone are limited for some reason, it is practicable that the installation should be provided, within the permissible vacuum range, with a separate self-propelled or overhead suction device in combination with a stationary or portable settling chamber in which case the design of said suction device may be other than shown in the drawings.

To make the essence of the invention more apparent, the description is accompanied by drawings showing a concrete version of a vacuum-and-pressure pneumatic conveying installation for moving cement from transport facilities into a storehouse. In these drawings.

The vacuum-and-pressure pneumatic conveying installation according to the invention comprises a suction device 1 (FIGS. 1, 2, 5, 6 and 7), a settling chamber 2, a cement unloading mechanism 3, an aerating chamber 4 communicating with a transport pipeline 5, and a jet blower 6.

Figure 5:
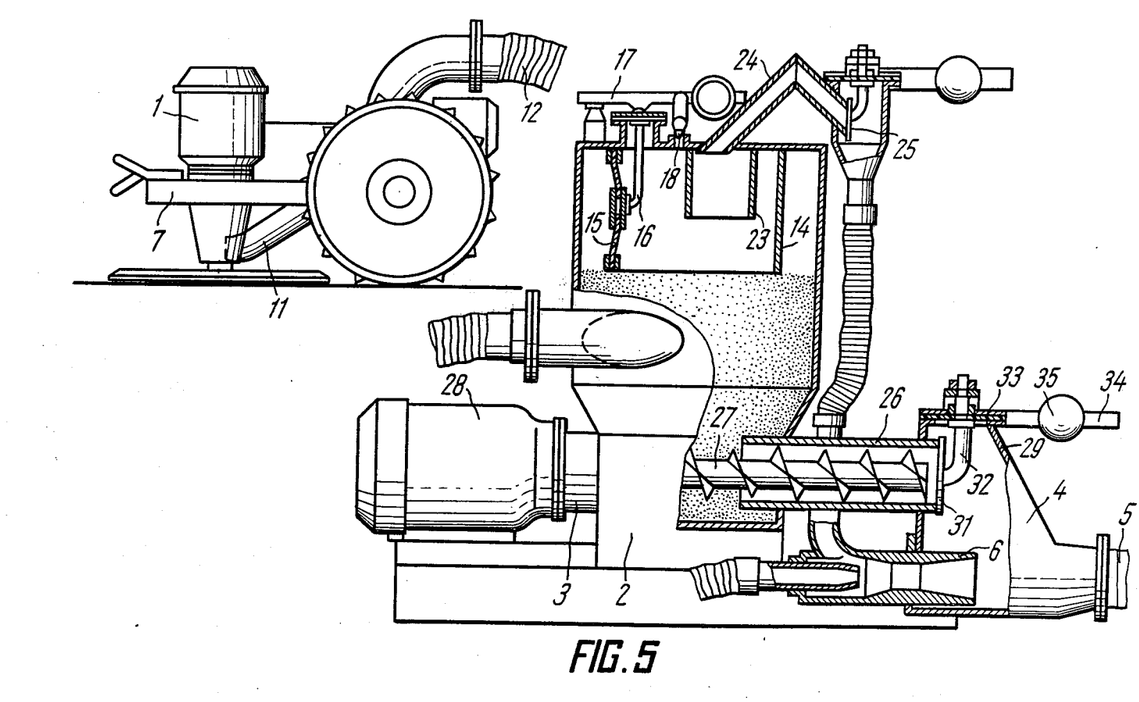
FIG. 5 is a side view of the installation, a stationary version partly cut away longitudinally.

The suction device 1 comprises a casing 7, a running gear 8, a break-down mechanism 9 in the form of a toothed bar, gathering discs 10 and a suction nozzle 11 connected with the settling chamber 2 either directly or through a flexible pipe 12 (FIG. 5).

Figure 3:
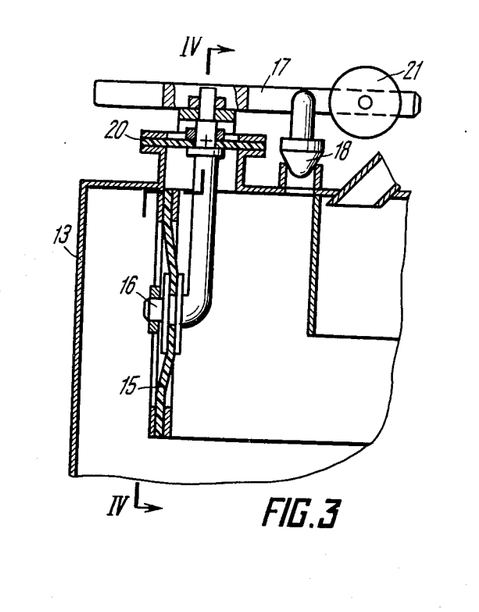
FIG. 3 shows fragment A in FIG. 1, enlarged.

The settling chamber 1 consists of a casing 13 secured to the upper part of which is a hollow cylindrical element 14 (FIGS. 1, 5–7) whose wall is provided with a diaphragm 15 (FIG. 3) connected by a rod 16 and lever 17 with a valve 18 built into the upper part of the casing 13 of the settling chamber 2. The hollow element 14 has a lower edge whose purpose is to limit the cement level in the settling chamber 2.

Figure 4:
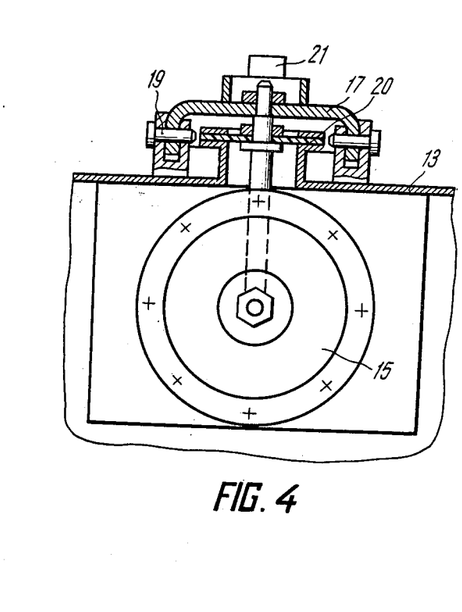
FIG. 4 is a section taken along line IV—IV in FIG. 3.

The lever 17 is capable of turning on cylindrical hinges 19 (FIG. 4) secured on the casing 13 in the fastening zone of the element 14 where there also is a flexible diaphragm 20 (FIG. 3) intended to transmit force from the diaphragm 15 to the lever 17 via the rod 16.

A movable counterweight 21 installed on the lever 17 is intended to adjust the magnitude of this force:

Installed on the casing 13 (FIG. 1) near the lever 17 is a limit switch 22 interacting with said lever The hollow cylindrical element 14 accommodates a cyclone 23 (FIGS. 1, 5 and 6) intended to reduce the dust content in the air sucked into the jet blower.

Figure 1:
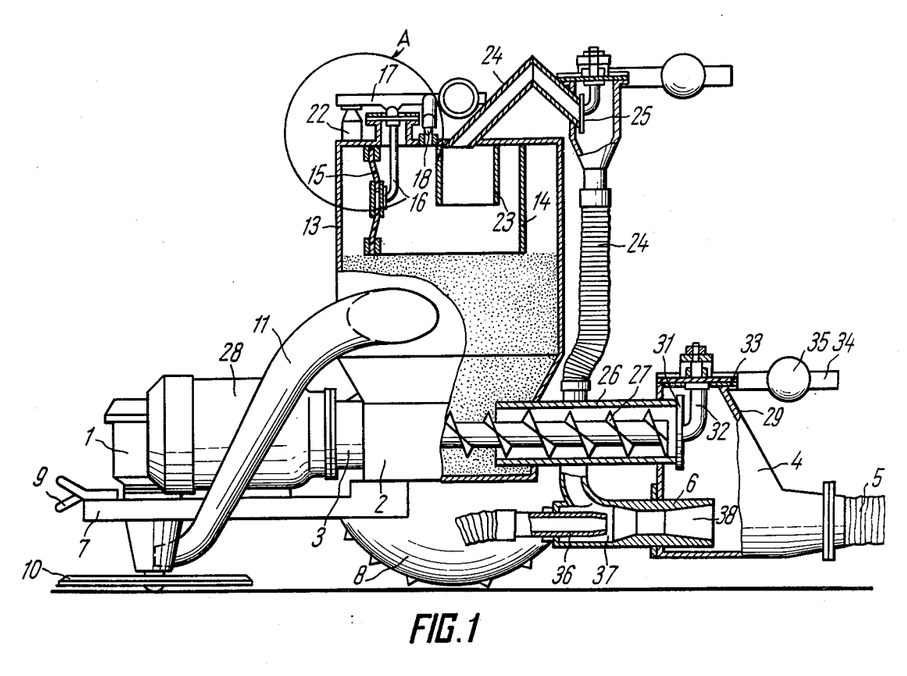
FIG. 1 is a side view of the installation according to the invention, a self-propelled version, partly cut away longitudinally.
Figure 2:
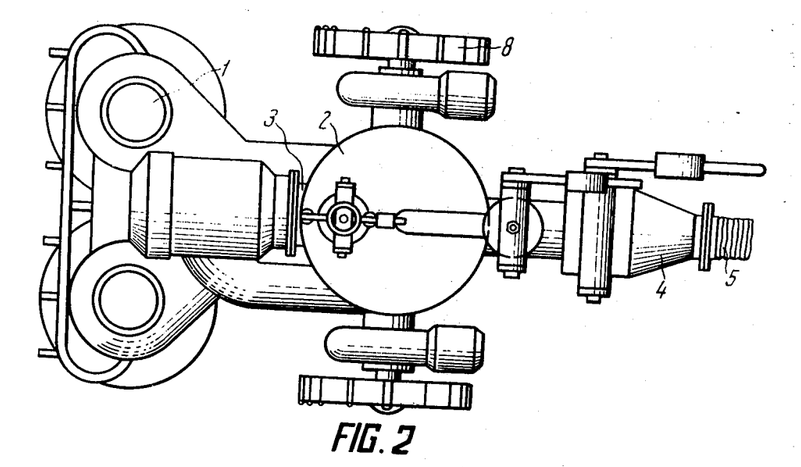
FIG. 2 is a top view of the installation shown in FIG. 1.
Figure 6:
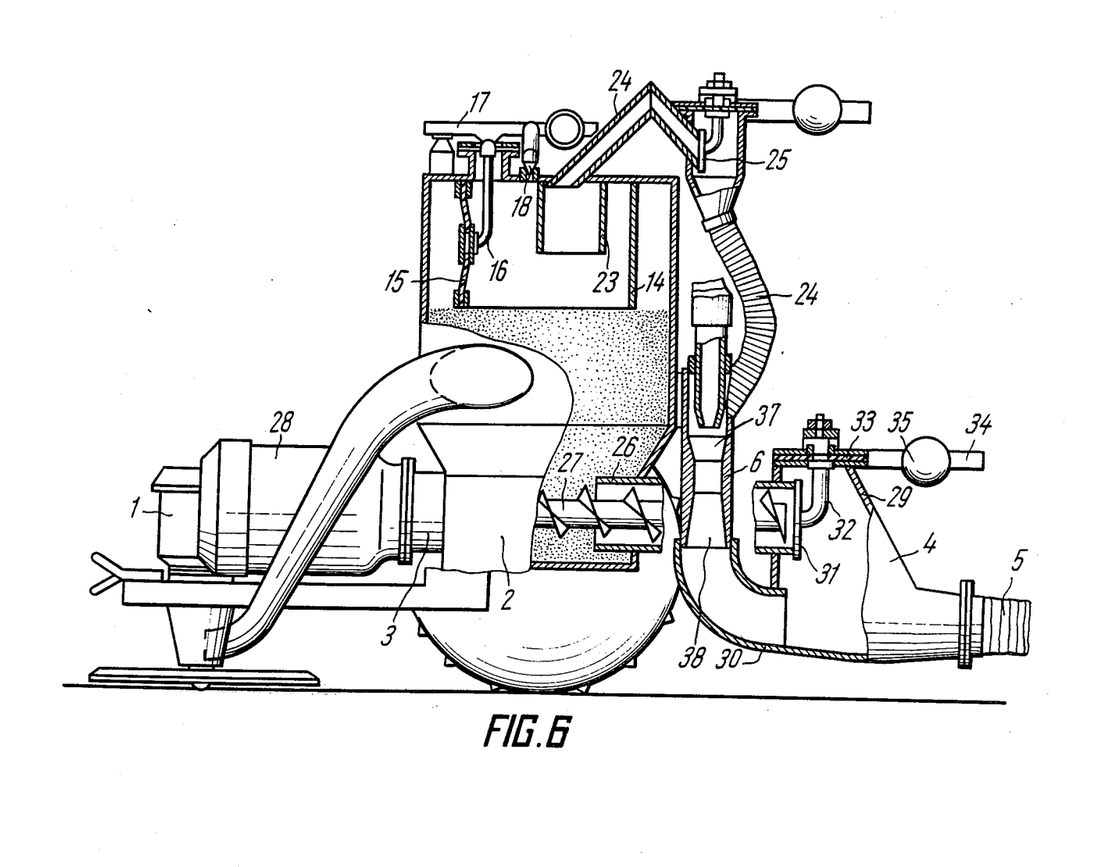
FIG. 6 is a side view of another version of a self-propelled pneumatic conveying installation, partly cut away.

The inside space of the cyclone 23 is connected by a pipe 24 with the suction space of the jet blower 6. To prevent the blow-by of compressed air from the aerating chamber 4 into the settling chamber 2, the pipe 24 is provided with a nonreturn valve 25 (FIGS. 1, 5, 6).

The unloading mechanism 3 built into the lower part of the settling chamber consists of a sleeve 26 accommodating an auger 27 which is driven by an electric motor 28.

Figure 7:
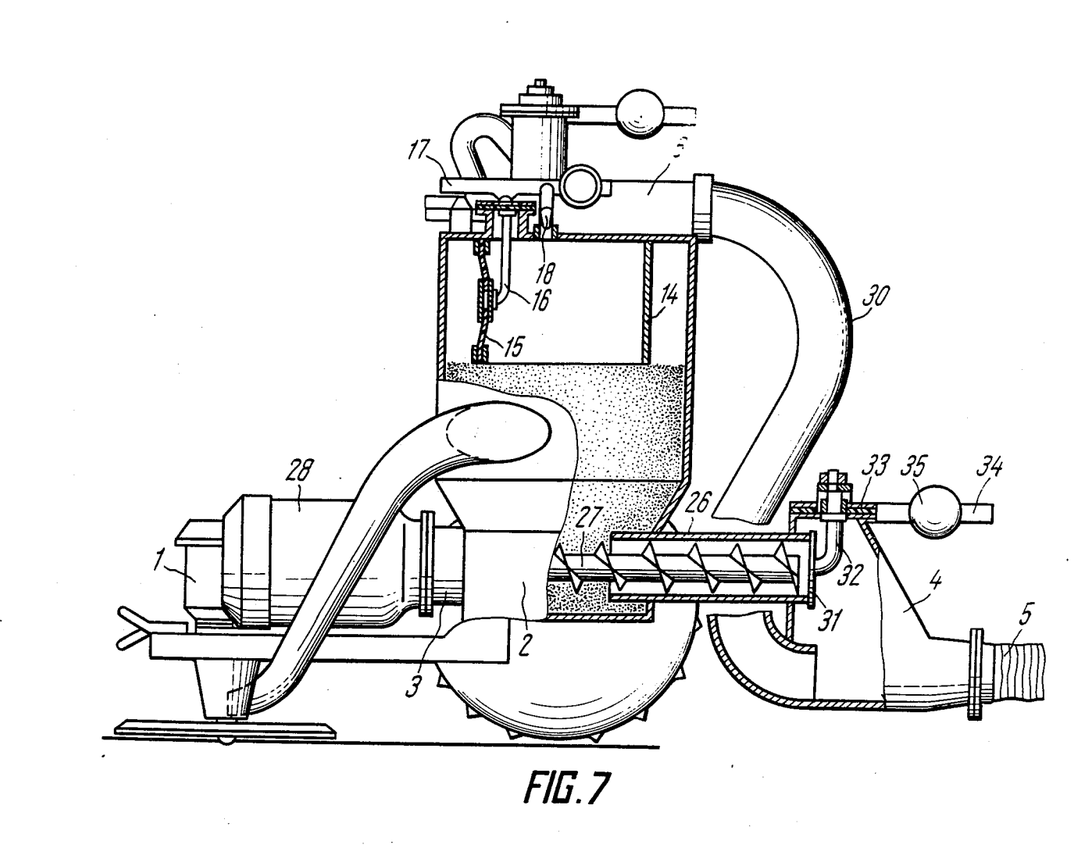
FIG. 7 is a side view of a third version of a self-propelled pneumatic conveying installation, partly cut away.

The aerating chamber 4 consists of a casing 29 with the transport pipeline 5 and jet blower 6 secured to it. The jet blower is either directly fastened to the casing 29 (FIG. 1 and 5) or is connected with it by a pipe 30 (FIGS. 6 and 7). In the aerating chamber 4 the cement mixes with the air delivered by the jet blower 6 and forms a cement-air mixture. A nonreturn valve 31 mounted in the upper part of the casing 29 prevents the blow-by of the cement-air mixture into the settling chamber 2 through the unloading mechanism 3. The non-return valve 31 is connected by a rod 32 via an elastic diaphragm 33 with a lever 34 which is hinged to the casing 29. A counterweight 35 sliding over the lever 34 controls the force which presses the valve 31 against the sleeve 26.

The closing of the nonreturn valve 31 is governed in this case by three summing forces acting on said valve in accordance with different laws:

by the effect of pressure of the cement-air mixture in the aerating chamber 4 on the diaphragm 33 which varies directly as the pressure built up in the casing 29;

by the gravity forces of the counterweight 35 which are practically constant at small turning angles of the lever 34; and by the effect of pressure of the cement coming from the settling chamber 2 and applied to the valve 31 only in the near-closed position of the latter.

The functioning of the valves 18 and 25 is similar to that described above, the sole difference being in that the materiial exerts no pressure on their diaphragms.

The jet blower 6 consists of a nozzle 36 for the delivery of compressed air (FIGS. 1, 5, 6), a suction space 37 and a delivery space 38 and is connected by its suction space 37 via the pipe 24 and nonreturn valve 25 with the settling chamber 2 for building up a vacuum therein required for sucking in cement and drawing out the dusty air while its delivery space 38 communicates with the aerating chamber 4 for building up pressure therein required for delivering cement into the transport pipeline 5.

In one version of the installation the jet blower 6 (FIG. 1) is built directly into the casing 29 of the aerating chamber 4. In this case the suction space 37 of the jet blower 6 is connected by a pipe 24 with the upper part of the settling chamber 2.

In another version, the jet blower 6 (FIG. 6) is located between the settling chamber 2 and aerating chamber 4 and its delivery space 38 communicates through the pipe 30 with the aerating chamber 4 whereas its suction space 37 communicates through the pipe 24 with the settling chamber 2.

In the third version, the suction space of the jet blower 6 (FIG. 7) is built into the upper part of the settling chamber 2 while its delivery space communicates with the aerating chamber 4 through the pipe 30.

The above-described vacuum-and-pressure pneumating conveying installation functions as follows.

The installation is brought close to the site where cement is to be unloaded from the transport vehicle. Then a power supply cable is connected to the installation, a compressed air hose is connected to the nozzle 36 (FIGS. 1, 5 and 6) of the jet blower, the electric power and compressed air supply is turned on and the electric motors of the suction device 1 and cement unloading mechanism 3 are set in operation. The suction device 1 or the entire installation moves into the transport facility on the running gear 8 and the elements of the suction device 1 come in contact with the material to be unloaded. The break-down device 9 agitates the compacted cement and the gathering discs 10 to move it towards the suction nozzle 11.

The jet blower 6 builds a vacuum in the settling chamber 2.

By means of this vacuum the cement together with atmospheric air is forced through the nozzle 11 and pipe 12 into the settling chamber 2 where the particles of cement settle down under their own weight and get into the unloading mechanism 3. The dusty air flowing through the nozzle 36 of the jet blower 6 enters the aerating chamber 4.

The cement is carried by the unloading mechanism 3 also into the aerating chamber wherein it mixes with the air delivered by the jet blower 6, acquires the form of a cement-air mixture and is carried under pressure into the transport pipeline 5 and further to the customer.

If the transport pipeline 5 becomes accidentally clogged, this causes a rise of air pressure in the aerating chamber 4. The pressure of air acting on the elastic partition 33 transmits an additional force via the rod 32 to the nonreturn valve 31 which is constantly loaded by the counterweight 35 secured on the lever 34. The nonreturn valve 31 tends to become pressed against the face surface of the sleeve 26 thereby compacting considerably the cement coming from the unloading mechanism 3 and preventing the blow-by of the cement-air mixture from the aerating chamber 4 back into the settling chamber 2.

In case of a considerable pressure rise in the aerating chamber 4, the vacuum in the suction space 37 of the jet blower 6 is replaced by a high pressure. Under this pressure the nonreturn valve 25 closes the pipe 24. When the nonreturn valves 25 and 31 are closed, there is no vacuum in the settling chamber, the cement ceases to be sucked in through the suction nozzle 11 and pressure of the supplied compressed air in the aerating chamber 4 rises to the maximum required for blowing through the transport pipeline 5. The pipeline 5 being blown through, the pressure in the aerating chamber 4 drops. The jet blower 6 resumes its normal operation, building up vacuum in the suction space 37.

The vacuum opens the nonreturn valve 25, the settling chamber 2 is also put under vacuum and the cement starts moving again through the suction nozzle 11 and pipe 12 into the settling chamber 2 from where the unloading mechanism 3 transfers it through the valve 31 into the aerating chamber 4 and transport pipeline 5.

If the unloading mechanism 3 gets clogged by foreign objects entrained accidentally by the cement, the discharge of cement from the settling chamber is sharply reduced which may lead to overfilling of the settling chamber 2 with cement. In this case the surface of cement rises to the lower edge of the element 14 and closes it from underneath. As a result, the vacuum inside the element 14 becomes deeper than in the settling chamber 2. This vacuum deflects the diaphragm 15 into the element 14 and the movement of this diaphragm is transmitted through the rod 16 and diaphragm 20 to the lever 17. The lever 17 turns on the hinges 19, overcomes the resistance of the counterweight 21 and opens the valve 18 thus opening the inside space of the element 14 to the atmosphere. The vacuum in the element 14 collapses and the process of cement suction into the settling chamber 2 ceases. Being turned by the diaphragm 15, the lever operates the limit switch 22 which sends a failure signal to the operator.

Under normal operating conditions the process of cement conveyance in the installation is controlled automatically.

The automatic control is effected as follows. As the level of the material in the settling chamber 2 rises, the amount of cement supplied into said chamber within a unit of time diminishes somewhat due to a growing resistance while the increased coefficient of auger filling increases the output of the unloading mechanism 3 and it starts feeding more material into the aerating chamber 4. As a result, the pressure of the cement-air mixture in the aerating chamber 4 rises whereas the coefficient of suction of the jet blower is somewhat reduced which decreases the vacuum in the settling chamber and, consequently, the amount of the sucked-in cement. The same occurs in case the length and, consequently, resistance of the transport pipeline increase.

A reduction in the amount of cement sucked into the settling chamber 2 results in a drop of cement level therein, thus reducing the cement discharge from the settling chamber. This in turn decreases pressure of the cement-air mixture in the aerating chamber 2 and raises the suction coefficient of the jet blower 5.

In this manner the installation is set automatically for the optimum output in accordance with such factors as volume weight of the material handled, length of the transport pipeline, hoisting height of the material layer, etc.

It can be seen from the above description that the advantages of the vacuum-and-pressure pneumatic conveying installation for pulverized materials according to the invention in comparison with the known installations can be summarized as follows:

the design and operation of the installation are simpler due to the absence of filters and a vacuum pump;

the reliability of the installation is improved by cancelling the units requiring continuous and careful servicing (hose filters and vacuum pump);

the vacuum in the settling chamber is built up by the energy of the pressure difference of the compressed air entering the aerating chamber of the installation which saves the energy which would otherwise be spent for building up such a vacuum;

the dusty air sucked in additionally with the handled material is delivered into the aerating chamber and employed for conveying the material which cuts down the amount of compressed air supplied into the installation;

the introduction of a jet blower increases the distance and height of material delivery; and the use of a cyclone instead of filters and of nonreturn valves makes the system of material conveyance completely enclosed which ensures the required sanitary conditions and makes it possible to convey pulverized materials with noxious or toxic admixtures.

Thus, the installation according to the invention is simpler in design, easier in operation, more reliable and economical owing to self-adjustment for optimum working conditions and completely utilizes the pressure difference of the delivered compressed air. Besides, it improves the labor conditions by a considerable reduction of the dust content in the ambient air.

We claim:

1. A vacuum-and-pressure pneumatic conveying installation for pulverized materials comprising: a settling chamber; a suction device communicating with said settling chamber; a material unloading mechanism built into the lower part of said settling chamber; an aerating chamber connected with said settling chamber by said material unloading mechanism which also delivers material into said aerating chamber; a transport pipeline connected to said aerating chamber; a jet blower whose suction space is connected with said settling chamber for building up vacuum therein required for drawing the material into said settling chamber and sucking dusty air from it while its delivery space is connected with said aerating chamber for building up pressure therein required for transporting the material from said aerating chamber; a hollow element which is open at the bottom, is secured to the upper part of the settling chamber and its lower edge is intended to limit the level of material in said settling chamber; at least one diaphragm located in the wall of said hollow element; a valve built into the upper part of said settling chamber, intended to control the supply of atmospheric air into said settling chamber when the latter becomes filled with material above the lower edge of said hollow element; and a rod connecting said diaphragm with said valve.

2. An installation according to claim 1, wherein the jet blower is built into the casing of the aerating chamber and its suction space is connected by a pipe with the upper part of the settling chamber.

3. An installation according to claim 2 wherein the pipe connecting the suction space of the jet blower to the settling chamber is provided with a nonreturn valve.

4. An installation according to claim 1 wherein the jet blower is located between the settling and aerating chambers, its delivery and suction spaces being connected by pipes with the aerating and settling chambers, respectively.

5. An installation according to claim 4 wherein the pipe connecting the suction space of the jet blower with the settling chamber is provided with a nonreturn valve.

6. An installation according to claim 1 wherein the jet blower is built into the upper part of the settling chamber and its delivery space is connected to the aerating chamber.

7. An installation according to claim 1 wherein the hollow element accommodates a cyclone whose inner space communicates with the suction space of the jet blower.

* * * * *